(No Model.)
W. J. LOTH.
DETACHABLE HEATING DRUM FOR STOVES.
No. 478,874. Patented July 12, 1892.
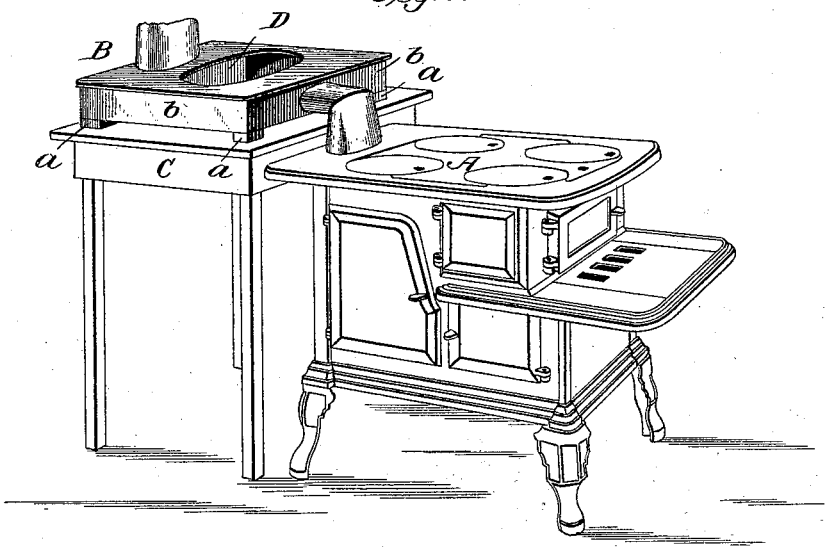
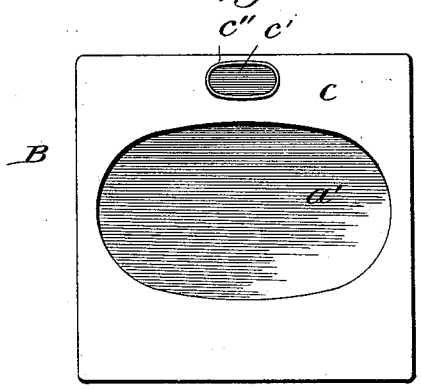
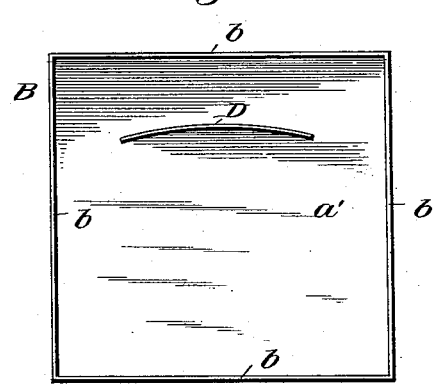
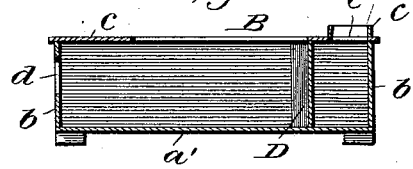
Witnesses
Wm. K. Ellis
S. C. Stokes
William J. Loth,
Inventor,
By
E. Everett Ellis
his Attorney

UNITED STATES PATENT OFFICE.

WILLIAM J. LOTH, OF WAYNESBOROUGH, VIRGINIA.

DETACHABLE HEATING-DRUM FOR STOVES.

SPECIFICATION forming part of Letters Patent No. 478,874, dated July 12, 1892.

Application filed April 12, 1892. Serial No. 428,813. (No model.)

*To all whom it may concern:*

Be it known that I, WILLIAM J. LOTH, a citizen of the United States, residing at Waynesborough, in the county of Augusta and State of Virginia, have invented certain new and useful Improvements in Detachable Heating-Drums for Stoves; and I do hereby declare the following to be a full, clear, and exact description of the invention, such as will enable others skilled in the art to which it appertains to make and use the same.

This invention relates to certain new and useful improvements in detachable and removable heating drums or reservoirs for attachment to stoves; and it consists, substantially, in such features of arrangement, construction, and combinations of parts, as will hereinafter be more particularly described, and pointed out in the claim.

The object of the invention is to provide a detachable heating drum or reservoir for stoves, which can be readily moved up into adjacent position to the stove and readily placed into communication therewith, so as to have the products of combustion pass into the same and be utilized in the heating of water, cooking of food, and the like.

A further object of the invention is to provide a heating drum or reservoir of the character referred to which shall be capable of being supported independent of any special attachment to the stove or the monopoly of any of the heating or cooking surface thereof, thus enabling double or increased results in a stove from the same amount of fuel.

A further object of the invention is to provide a heating drum or reservoir of the character referred to which can be readily removed and stored or placed away in any convenient place when not required for use, thus economizing in the amount of space consumed in keeping the same.

A still further object of the invention is to greatly simplify the construction and arrangement of parts constituting the said drum or reservoir as compared with many former inventions, as will more fully hereinafter appear on reference to the accompanying drawings, in which—

Figure 1 represents a view in perspective of a stove having my improved heating drum or reservoir attached thereto in position for use. Fig. 2 is a top plan view of the said drum or reservoir. Fig. 3 is a view thereof with its upper portion removed, so as to indicate the interior location and arrangement of the deflector for the products of combustion. Fig. 4 is a longitudinal sectional elevation taken on the line $x$ $x$.

In carrying my invention into effect I construct my improved heating drum or reservoir of any suitable shape or contour, preferably square or rectangular, the same being formed with a suitable base or bottom on which suitable legs are attached, so as to enable the same to stand in proper position upon a table, ledge, shelf, or other support which may be moved up in proximity to the stove to which the drum is to be attached. Suitable sides are provided all around the drum, and over the top of the same is a projecting ledge having a central opening over which a boiler, kettle, or other vessel to be heated is placed. In one side is an opening designed to be placed into communication with the flue-opening of a stove, while in the projecting ledge or top is a similar opening surrounded by a collar to receive the lower end of the ordinary stovepipe which leads to the chimney or flue in the manner usual. Fitting between the top and bottom of the said drum or reservoir even with the edge of the central opening in said top and immediately before the opening which leads to the stovepipe is a deflector for causing the products of combustion which enter the drum to be deflected and evenly distributed throughout the interior of said drum, and in this way the effects of the heat will be equally disseminated throughout. This class of heating drums or reservoirs has heretofore been provided with deflectors for a similar purpose; but the objection to them is that they are only formed with or attached to the bottom of the drum without any support for their upper edge, and the result is that they become easily broken in use and are rendered useless in so far as their function as a distributer of the products of combustion is concerned. Another objection with those made heretofore is that the deflector, being located about central of the drum and some distance forward of the point of communication of the stovepipe with the interior of the drum, any back-draft which may be occasioned in the stovepipe by gusts of wind down the chimney or flue causes the products to be blown back into the stove, and thereby causes considerable smoke and smell. By arranging my deflector-plate between the boiler or kettle opening and the stovepipe-opening of the projecting ledge and lengthwise therewith, leaving a space at each end for the passage of the products of combustion, the defects mentioned are greatly remedied. Furthermore, the said deflector-plate connects the projecting ledge with the bottom of the drum, and thereby strengthens the parts at this point, which otherwise are rendered weak by the formation in the ledge of the stovepipe-opening.

Referring to the accompanying drawings by the letters marked thereon, A represents an ordinary cooking-stove, and B represents a heating drum or reservoir constructed in accordance with my invention, and, as shown, is supported in position adjacent to the stove on a table C, the said drum or reservoir or heating-drum being provided with short supporting-legs $a$, so as to keep the same elevated a sufficient height above the support upon which the drum may be placed. As shown, the drum or reservoir is made square or rectangular, although any preferred shape may be resorted to, and the same is constructed of the bottom $a$, sides $b$, and top of ledge $c$. In one of the sides $b$ is an opening $d$ for the communication with the flue-opening of the stove, while in the top $c$ is a similar opening $c'$, surrounded by a collar $c''$ for receiving the lower end of the stovepipe.

D represents the deflector for the products of combustion, and, as already explained, said deflector is arranged immediately before the stovepipe-opening $c'$, whereby the effects of back-drafts are overcome and the entire device rendered additionally strong. The said deflector, it will be observed, conforms to the shape of the boiler or kettle opening of the ledge and is located between such opening and the stovepipe-opening, a space being left at each end for the passage of the products of combustion. The said deflector also connects the ledge and bottom of the drum and serves as a strengthener and support for the ledge in an obvious manner. In this way the parts are united together strongly and there is considerably less danger of breakage of the deflector and cracking of the ledge.

This drum or reservoir can be easily cast like other parts of a stove, and is intended to be sold to the trade as an improved article of manufacture, since it can be employed in connection with any stove at present in use without any changes having to be made or the use of special appliances.

Having thus described my invention, what I claim, and desire to secure by Letters Patent, is—

A heating drum or chamber for stoves, the same being formed with an upper projecting ledge having therein a boiler or kettle opening and an opening for communication with a stovepipe, and a deflector-plate located intermediate of said openings and uniting the ledge with the bottom of the drum or chamber, the said deflector-plate conforming in shape to the edge of the kettle-opening and terminating short of the sides of the drum, so as to leave spaces for the passage of products of combustion, substantially as shown, and for the purpose described.

In testimony whereof I affix my signature in presence of two witnesses.

WILLIAM J. LOTH.

Witnesses:
I. K. MORAN,
J. FRANK WILLSON.